United States Patent [19]

Wörner et al.

[11] Patent Number: 5,441,135
[45] Date of Patent: Aug. 15, 1995

[54] HYDRODYNAMIC TORQUE CONVERTER WITH LOCK-UP CLUTCH

[75] Inventors: Otto Wörner, Reutlingen; Rolf Schröder, Stuttgart; Heinz Schultz, Hochdorf, all of Germany

[73] Assignee: Mercedes-Benz AG, Germany

[21] Appl. No.: 167,283

[22] Filed: Dec. 15, 1993

[30] Foreign Application Priority Data

Dec. 17, 1992 [DE] Germany .............. 42 42 625.1

[51] Int. Cl.6 .............................. F16D 33/00
[52] U.S. Cl. .................. 192/3.29; 192/3.25
[58] Field of Search ............ 192/3.25, 3.29, 3.3, 192/3.33

[56] References Cited

U.S. PATENT DOCUMENTS

| | | | |
|---|---|---|---|
| 2,931,472 | 4/1960 | Ahlen | 192/3.29 X |
| 4,153,147 | 5/1979 | Chana | 192/3.29 X |
| 4,673,071 | 6/1987 | Moroto et al. | 192/3.25 X |
| 4,951,788 | 8/1990 | Martin | 192/3.29 X |
| 5,020,646 | 6/1991 | Koshimo | |
| 5,129,493 | 7/1992 | Edmunds | 192/3.29 |
| 5,172,796 | 12/1992 | Campbell et al. | 192/3.29 |
| 5,314,048 | 5/1994 | Bojas et al. | 192/3.29 |

FOREIGN PATENT DOCUMENTS

| | | |
|---|---|---|
| 0200335 | 12/1986 | European Pat. Off. . |
| 0405772 | 1/1991 | European Pat. Off. . |
| 1500499 | 6/1969 | Germany . |
| 6938797 | 10/1969 | Germany . |
| 3710902 | 10/1987 | Germany . |
| 1100813 | 1/1968 | United Kingdom . |
| 1452721 | 10/1976 | United Kingdom . |
| 1485085 | 9/1977 | United Kingdom . |
| 2060791 | 5/1981 | United Kingdom . |

*Primary Examiner*—Andrea L. Pitts
*Attorney, Agent, or Firm*—Evenson, McKeown, Edwards & Lenahan

[57] ABSTRACT

In a hydrodynamic torque converter, an axial abutment is arranged to support friction discs of a lock-up clutch and a clutch actuator working pressure chamber accommodating an axial piston so as to move with a friction disc carrier. Together with a second friction disc carrier, the friction disc carrier torsionally holds the friction discs in alternating sequence and is also located in a centripetal flow between a pump impeller outlet and a torque converter return conduit.

4 Claims, 3 Drawing Sheets

HYDRODYNAMIC TORQUE CONVERTER WITH LOCK-UP CLUTCH

BACKGROUND AND SUMMARY OF THE INVENTION

The present invention relates to a torque converter in which a bell-shaped casing shell rotatably accommodating a centripetal-flow turbine wheel is connected in a pressure-tight manner to the outer shell of a pump impeller and to the turbine wheel to move therewith, by way of a lock-up clutch which, can be actuated by a clutch actuator of the axial piston type, and in which the friction discs of the lock-up clutch are alternatively torsionally held on two annular friction disc carriers which are concentric with the torque converter axis of rotation.

In a known torque converter of the type mentioned in British Patent Specification 1,485,085, the friction discs are arranged in a chamber encapsulated against the pressure medium by the solid friction disc carrier, the solid abutment disc and the solid axial piston so that difficulties arise with respect to the removal of heat when the lock-up clutch is engaged.

An object on which the present invention is the creation of interference-free heat removal so as to ensure a sensitive, accurately metered control of the clutch slip of the lock-up clutch, with this control being intrinsically used for fuel economy. By regulating a certain slip condition, the transmission of torque non-uniformities of the drive engine to the drive train downstream of the torque converter in the force path is also prevented.

The foregoing object has been achieved in an advantageous manner in accordance with the present invention by providing that a coupling space is provided within the casing, which coupling space is bounded in one direction of the torque converter axis of rotation by a radial end wall of the casing shell and, in the opposite direction by the turbine wheel, the clutch space has, at a radially outer position, a flow connection to an annular gap between the pump impeller outlet and the turbine wheel inlet and, has at a radially inner position, a flow connection to a torque converter return conduit, and the friction disc carriers provided with radial through-flow openings are arranged so that their complete length is located transversely in the centrifugal flow of the clutch space occurring between the two flow connections.

In the torque converter according to the present invention, the influence of heat generated by frictional work on the control of the clutch slip is kept small because the friction discs are arranged in an outer cooling oil flow branched off from the annular gap between the pump impeller outlet and the turbine wheel inlet.

In the torque converter according to the invention, providing oil delivery grooves on the ends of the friction discs held in a carrier also contributes to intensifying the cooling oil flow through the lock-up clutch. The effect of a centripetal flow through the lock-up clutch is amplified by providing that the second flow connection contains at least one axial through-hole of the wheel hub of the turbine wheel.

In the torque converter according to the present invention, the pressure level can be kept low in the case of a clutch actuation and thereby the sealing of the pressure passages can be facilitated if the friction discs are arranged axially between an abutment, held so that as to be fixed axially and so held torsionally on one of the friction disc carriers and an annular pressure piece, and at least one transmission lever is operatively arranged between the pressure piece and the axial piston to increase a resultant engagement force on the pressure piece relative to the piston pressure force is effectively arranged, the pressure piece being held so as to be axially displaceable and torsionally fixed on the friction disc carrier having the abutment. The rotational speed range in which the transmission of rotational vibrations of the drive engine to the downstream drive train is avoided and is substantially extended where the casing shell is connected to the turbine wheel by a torsional vibration damper arranged in series in a force path with the lock-up clutch and connected to one of the friction disc carriers.

BRIEF DESCRIPTION OF THE DRAWINGS

These and other objects, features and advantages of the present invention will become more readily apparent from the following detailed description thereof when taken in conjunction with the accompanying drawings wherein:

FIG. 1a is a partial, enlarged view of the friction discs and friction disc carriers of the embodiment of FIG. 1 with radial flow passages and oil delivery grooves shown schematically;

DETAILED DESCRIPTION OF THE DRAWINGS

Figure 1:
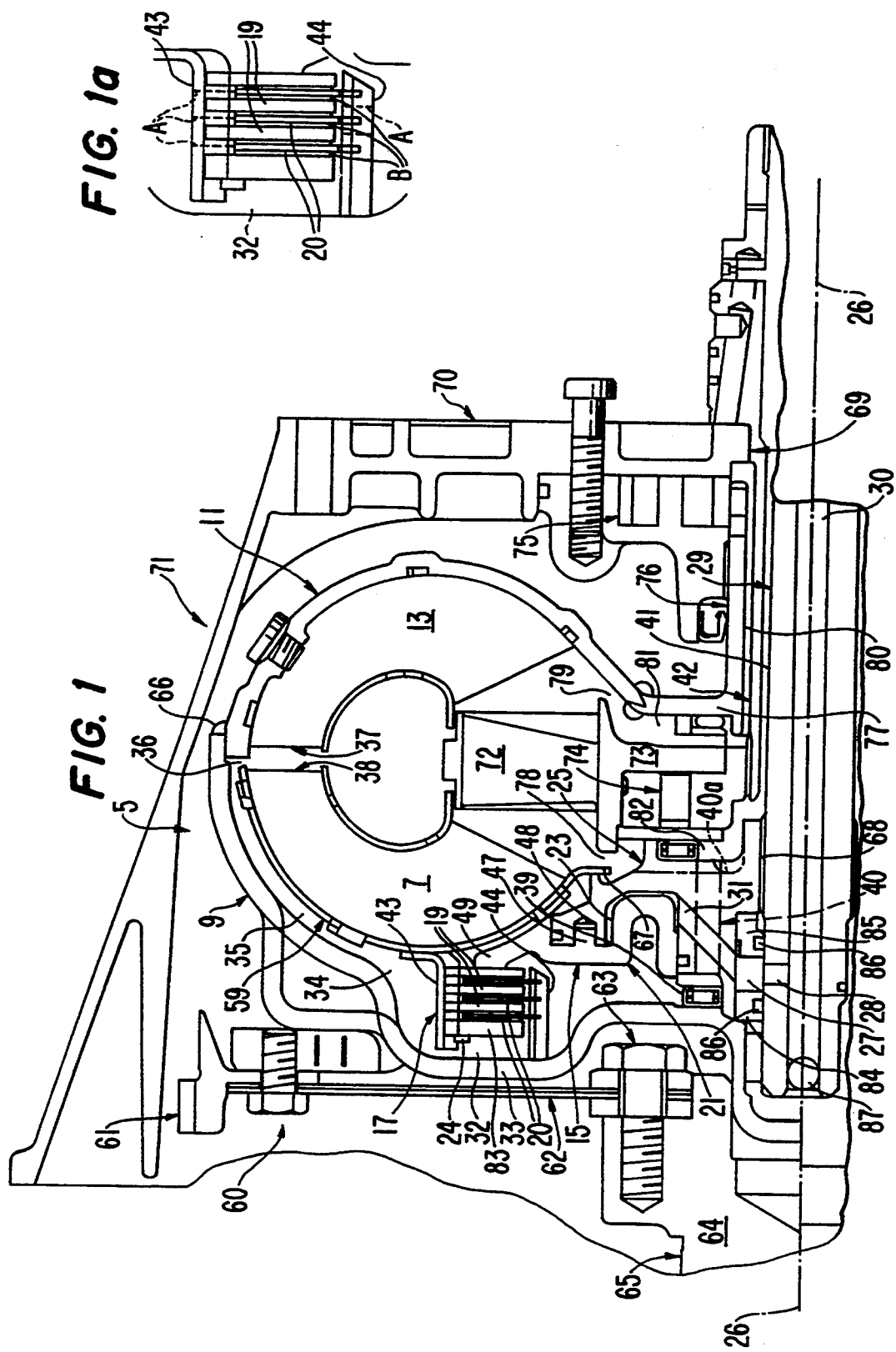
FIG. 1 is a partial, cross-sectional schematic view of a first embodiment of a hydrodynamic torque converter according to the present invention in a first embodiment.

Referring now to the embodiment of FIG. 1, a hydrodynamic torque converter 5 has a bell-shaped casing shell 9 which is torsionally connected in a conventional manner by radially outer bolt fastenings 60 both to a starter toothed ring 61 and to a drive disc 62 which is flexible in the direction of a torque converter rotation axis 26—26. The drive disc 62 is connected in a known manner by bolt fastenings 63 located radially at the inside to an output flange 64 of a crankshaft 65 of a drive engine. The casing shell 9 accommodates, among other things, a centripetal-flow turbine wheel 7 for rotation thereof and is rigidly connected in a pressure-tight manner at a location 66 to an outer shell 11 of a pump impeller 13.

An outer shell 59 of the turbine wheel 7 has a radially inner flange 67 which is rigidly connected to a wheel hub 25. The wheel hub 25 is torsionally connected by appropriate axial splines 68 to a turbine wheel shaft 29 concentric with the torque converter rotation axis 26—26. The turbine wheel shaft 29 passes, with clearance, through a central opening 69 of a radial end wall 70 of an outer casing 71 accommodating the torque converter 5.

The inner hydrodynamic operational circuit of the torque converter 5 is completed in known manner by a guide vane wheel 72 located between the turbine wheel 7 and the pump impeller 13. The hub 73 of the guide vane wheel 72 is conventionally supported by a free wheel 74 on a hollow stator shaft 42, through which the turbine wheel shaft 29 passes and which is in turn fixed immovably in the central opening 69 by a press fit. A gear pump 75, which is driven by a hollow pump shaft 76 through which the stator shaft 42 passes, is arranged on the inside of the end wall 70. The pump shaft 76 is rigidly connected to a hub 77 of the outer shell 11 of the pump impeller 13.

The inner hydrodynamic operational circuit of the torque converter 5 is connected at two positions to an outer pressure medium circuit for connecting in, as required, an oil cooler by way of a known control appliance, with which the gear pump 75 is also in connection. There is, therefore, a torque converter supply conduit from the control appliance (not shown), and the supply conduit is connected to an axially extending annular gap 80 between the stator shaft 42 and the pump shaft 76. The annular gap 80 communicates with a radial annular gap 81 which is enclosed by the hubs 73 and 77 and opens into the inner hydrodynamic operational circuit at a position 79 between the guide vane wheel outlet and the pump impeller inlet.

A torque converter return conduit, which starts from an axially extending annular gap 41 between the turbine wheel shaft 29 and the stator shaft 42, leads to the control appliance (not shown). The axially extending annular gap 41 communicates with a radial annular gap 82, which is enclosed by the wheel hub 25 and the overrunning clutch 74 and communicates with the inner hydrodynamic operational circuit at a position 78 between the turbine wheel outlet and the guide vane wheel inlet.

An annular clutch space 32, which is located concentrically with the torque converter rotation axis 26—26 and through which a partial flow of the outer pressure medium operational circuit is passed, is provided between a front radial end wall 33 of the casing shell 9 and the turbine wheel 7. For this purpose, a flow gap 35 between the casing shell 9 and the outer shell 59 starts from a radially outer annular gap 36 between the pump impeller outlet 37 and the turbine wheel inlet 38. This flow gap 35 opens into the clutch space 32 at a radially outer position 34 relative to the clutch space 32. At a radially inner position 39, the clutch space 32 communicates by a flow connection 40 with the radial annular gap 82 which is connected to the torque converter return conduit by the axially extending annular gap 41.

Two different-diameter, annular friction disc carriers 43, 44 of a lock-up clutch 17 are arranged concentrically with the torque converter rotation axis 26—26 in the clutch space 32 such that both are subjected to the centripetal flow in the clutch space 32 over their complete length. One end of the larger friction disc carrier 43 is rigidly fixed to the outer shell 59, and an opposite end of the other friction disc carrier 44 is rigidly fixed to the end wall 33.

The friction disc carriers 43, 44 are respectively provided with radial flow passages A (FIG. 1a) so that the friction discs 19, 20, which are held rotationally fixed and axially displaceable on the friction disc carriers 43, 41, have oil admitted thereto. This admission is helped by the friction discs 20 rotating with the crankshaft 65 when slipping, or even in the disengaged condition of the lock-up clutch 17, and because the friction discs 20 are provided, in a known manner, with oil delivery grooves B (FIG. 1a) on their radial end faces.

The friction discs 19, 20 are axially arranged between a pressure piece 49, which can be actuated by a clutch actuator 15 of the axial piston type, and an annular axial support disc 83 which is held on the outer friction disc carrier 43 so as to be torsionally fixed and intrinsically axially displaceable. The axial support disc 83 is supported, under the influence of the engagement forces, on an axial abutment 24 in the form of a lock ring inserted in an internal peripheral groove of the friction disc carrier 43.

The pressure piece 49 is integrally configured with an axial piston 21 which is accommodated in the conventional manner in a working pressure chamber 23 of the wheel hub 25 so that it is pressure-tight and displaceable. The working pressure chamber 23 is connected by holes 31, which extend transversely to the torque converter rotation axis 26—26, to an annular passage 27 configured between the wheel hub 25 and the turbine wheel shaft 29. The annular passage 29 is, in turn, connected to an axial pressure passage 30 of the turbine wheel shaft 29 via holes 28 in the turbine wheel shaft 29. The holes 28 extend transversely to the torque converter rotation axis 26—26.

The annular passage 27 is bounded in the direction of the torque converter rotation axis 26—26 by two metallic ring inserts 84, 85 which are immovably fixed by a press fit relative to the wheel hub 25 and are each sealed against the turbine wheel shaft 29 by a sealing ring 86. The axial pressure passage 30 is sealed in a pressure-tight manner by a ball stopper 87 at its end facing towards the end wall 33. As a result, the pressure medium guidance from the turbine wheel shaft 29 to the working pressure chamber 23 is free from sealing surfaces rotating relative to one another and also free from axial compression forces acting outwardly. That is, the relatively elastic casing shell 9, and in particular its radial end wall 33, are free from thrust forces caused by the pressure medium supply in the region between the working pressure chamber 23 and the pressure passage 30.

The outer friction disc 19 interacting with the pressure piece 49 and the working pressure chamber 23 are each arranged so as to be torsionally fixed relative to the turbine wheel 7. A rotational lock, which is in the form of an axial locking pin 47 on the working piston 21 and a corresponding recess 48 in the wall of the working pressure chamber 23, is provided between the working piston 21 and the working pressure chamber 23 in order to avoid unintentional relative rotations between the piston and the turbine wheel.

The flow connection 40 between the radially inner position 39 of the clutch space 32 and the axially extending annular gap 41 is provided by one or more axial passage holes 40a of the wheel hub 25. These holes 40a open into the clutch space 32 at one end and, at the other end, into the annular gap 82 communicating with the axially extending annular gap 41. The inner friction disc carrier 44 is connected to the end wall 33 to move therewith. The pressure passage 30 is connected with a known control appliance for controlling the clutch slip and for reducing the clutch torque during gear changes.

Figure 2:
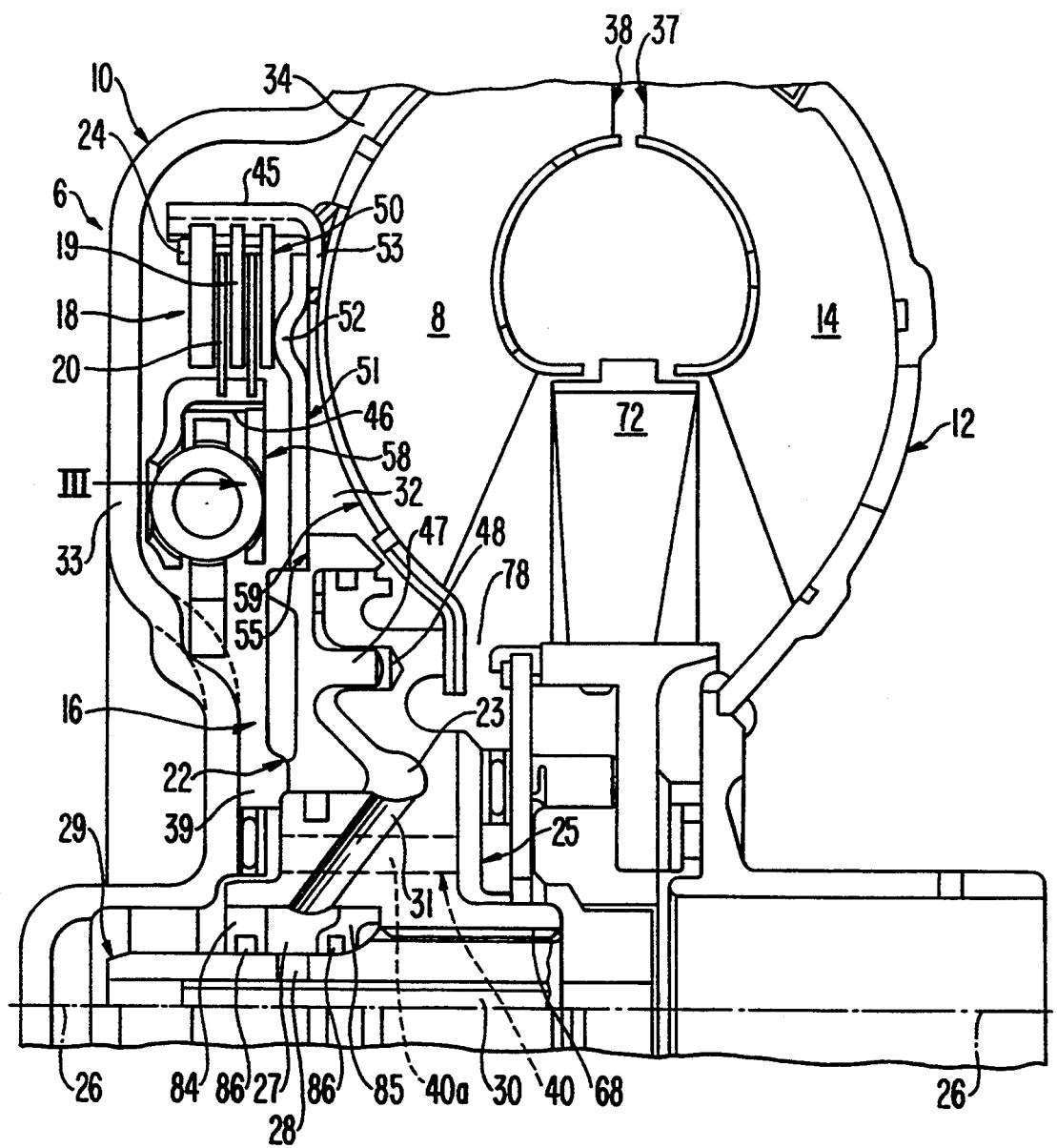
FIG. 2 is a partial cross-sectional view of a second embodiment of a hydrodynamic torque converter according to the present invention again in a plane containing the axis of rotation of the torque converter.
Figure 3:
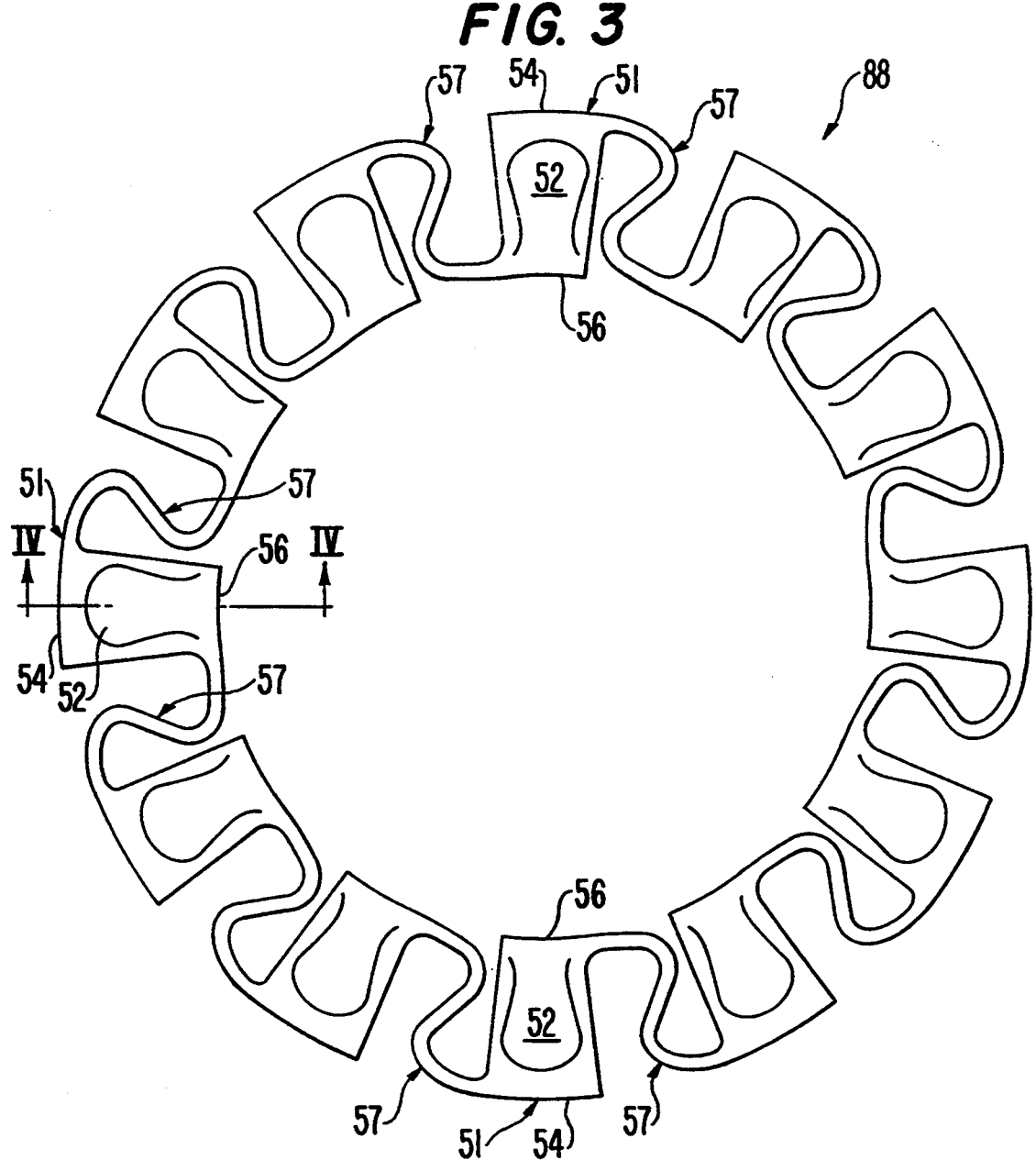
FIG. 3 is a plan view of a ring element in the direction of the arrow III in FIG. 2.
Figure 4:
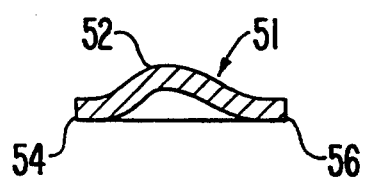
FIG. 4 is a sectional view through a transmission lever of the ring element along line IV—IV of FIG. 3.

The embodiment of the torque converter designated generally by numeral 6 in FIGS. 2 to 4 differs from the previously described embodiment 5 of FIG. 1 only in that at least one transmission lever 51 is effective between the clutch actuator 16 and the lock-up clutch 18 and in that the end wall 33 is connected by a torsional vibration damper 58, which is connected to a friction disc carrier 46, and by a series-arranged lock-up clutch 18 to the turbine wheel 8.

In common with the embodiment 5 of FIG. 1, the following arrangement is adopted in the case of the embodiment 6 of FIG. 2. A bell-shaped outer casing shell 10, which accommodates, inter alia, a centripetal flow turbine wheel 8, is welded in a pressure-tight manner to an outer shell 12 of a pump impeller 14 to move therewith. An outer shell 59 of the turbine wheel 8 is connected to both a larger diameter annual friction disc carrier 45 and a wheel hub 25 to move therewith in unison. The lock-up clutch 18 has outer and inner friction discs 19, 20 which are supported via a thrust support disc on a thrust abutment in the form of a locking ring 24 which is inserted in an inner peripheral groove of the outer friction disc carrier 45.

The lock-up clutch 18 is located in an annular clutch space 32 which is concentric with the torque converter rotation axis 26—26 and bounded in one axial direction by the radial end wall 33 of the casing shell 10 and in the other axial direction by the turbine wheel 8. At a radially outer location 34, the clutch space 32 has a flow connection with an outer annular gap between the pump impeller outlet 37 and the turbine wheel inlet 38. At a radially inner position 39, the clutch space 32 has a flow connection 40, in which there are axial passage holes 40a of the wheel hub 25, with a torque converter return conduit.

The torque converter return conduit communicates with the inner hydrodynamic operational circuit of the torque converter 6 at a position 78 between the turbine wheel outlet and a guide vane wheel 72. The wheel hub 25 is coupled to a turbine wheel shaft 29 by appropriate axial splines 68. This turbine wheel shaft 29 has an axial pressure passage 30 which is closed in a pressure-tight manner at its end facing towards the end wall 33 and is connected, by holes 28 extending transverse to the torque converter rotation axis 26—26, to an annual space which is concentric with the torque converter rotation axis 26—26. The annular space 27 is provided on the wheel hub 25 and is connected to a working pressure chamber 23 provided in the wheel hub 25 by holes 31 of the wheel hub 25, these holes 31 extending transverse to the torque converter axis of rotation 26—26. The working pressure chamber 23 is configured to displaceably accommodate the axial piston 22 of the clutch actuator 16 in the conventional manner. The annular space 27 is bounded in the axial directions by two metallic annular inserts 84, 85, which are held by a press fit in the wheel hub 25 and which are each sealed by an annular seal 86 against the turbine wheel shaft 29. The inserts 84, 85 are also connectable together by axial connecting webs with radial pressure medium passages and can thereby form an integral component.

The inner friction discs 20 engaging between the outer friction discs 19 are arranged to rotate therewith and to be axially displaced on the inner friction disc carrier 46 connected to the torsional vibration damper 58 but, in contrast, of the outer friction discs 19—which together with the thrust support disc are held to rotate therewith and can be axially displaced on the outer friction disc carrier 45—the friction disc adjacent to the turbine wheel 8 is used as a pressure piece 50 which can be actuated by the axial piston 22 in the engagement direction by a plurality of transmission levers 51 of an annular element 88 which is arranged concentrically with the torque converter rotation axis 26—26. For this purpose, each transmission lever 51 has a tappet 52 at a radially central position for contact on the pressure piece 50, a support edge 54 (FIG. 3) located radially outside the tappet 52 for contact on an axial abutment 53 on the outer shell 59 and a support edge 56 located radially inside the tappet 52 for contact on a thrust support 55 of the axial piston 22.

The annular element 88 has S-shaped connecting webs 57 each of which connects together two transmission levers 51 which are adjacent to one another in the peripheral direction. Otherwise, the two embodiments 5 and 6 of the torque converter according to the present invention are the same. With respect to the two features, namely the torsional vibration damper 58 and the transmission lever 51, variants of the first embodiment 5 of FIG. 1 are possible in which one or both of the lever 51 and the damper 58 are used.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A hydrodynamic torque converter comprising a bell-shaped casing shell, a centripetal-flow turbine wheel rotatably accommodated in the casing shell and connected in a pressure-tight manner to an outer shell of a pump impeller and casing shell to move therewith by way of a lock-up clutch actuatable by a clutch actuator of axial piston type, which lock-up clutch has friction discs alternatively torsionally held on two annular friction disc carriers concentrically arranged with a torque converter rotation axis, wherein a coupling space is provided within the casing shell, which coupling space is bounded in one direction of the torque converter rotation axis by a radial end wall of the casing shell and, in an opposite direction, by the turbine wheel, and the coupling space having, at a radially outer position thereof, a first flow connection to an annular gap between a pump impeller outlet and a turbine wheel inlet and, at a radially inner position thereof, a second flow connection to a torque converter return conduit, and the friction disc carriers being provided with radial through-flow openings and arranged such that a complete length thereof is located transversely in a centrifugal flow of the coupling space occurring between the first and second flow connections whereby one of the friction disc carriers has an end fixed to the turbine wheel and the other of the friction disc carriers has an end remote from the end of the one friction disc carrier fixed to the turbine wheel and fixed to the radial end wall.

2. The converter according to claim 1, wherein oil delivery grooves are provided at ends of the friction discs held in one of the friction disc carriers.

3. The converter according to claim 1, wherein the second flow connection contains at least one axial through-hole of a wheel hub of the turbine wheel.

4. The converter according to claim 1, wherein the casing shell is connected to the turbine wheel by a torsional vibration damper arranged in series in a force path with the lock-up clutch and connected to one of the friction disc carriers.

* * * * *